(12) United States Patent
Thompson

(10) Patent No.: US 11,571,789 B2
(45) Date of Patent: Feb. 7, 2023

(54) SPANNER FOR SIMULTANEOUSLY GRIPPING A PLURALITY OF FASTENERS AND A METHOD FOR SIMULTANEOUSLY GRIPPING A PLURALITY OF FASTENERS

(71) Applicant: NAK Industries Pty Ltd, Singleton (AU)

(72) Inventor: Nigel Thompson, Singleton (AU)

(73) Assignee: NAK Industries Pty Ltd, Singleton (AU)

( * ) Notice: Subject to any disclaimer, the term of this patent is extended or adjusted under 35 U.S.C. 154(b) by 184 days.

(21) Appl. No.: 17/196,784

(22) Filed: Mar. 9, 2021

(65) Prior Publication Data
US 2022/0288752 A1  Sep. 15, 2022

(51) Int. Cl.
*B25B 23/10* (2006.01)
*F16B 1/00* (2006.01)
*B25B 13/04* (2006.01)

(52) U.S. Cl.
CPC ............ *B25B 23/105* (2013.01); *B25B 13/04* (2013.01); *F16B 1/00* (2013.01); *F16B 2001/0035* (2013.01)

(58) Field of Classification Search
CPC ....... B25B 23/105; B25B 13/04; B25B 23/12; B25B 23/103; B25B 13/56; F16B 1/00; F16B 2001/0035
See application file for complete search history.

(56) References Cited

U.S. PATENT DOCUMENTS

2021/0291331 A1 * 9/2021 Quicke .................. B25B 13/16

\* cited by examiner

*Primary Examiner* — Lee A Holly
(74) *Attorney, Agent, or Firm* — Christensen, Fonder, Dardi & Herbert PLLC

(57) ABSTRACT

A spanner for simultaneously gripping a plurality of fasteners. The spanner includes a body, the body having a plurality of spaced apart fastener grips for simultaneously gripping the plurality of fasteners. The spanner also includes at least one attachment member for attaching the spanner to a structure the fasteners attach to.

18 Claims, 5 Drawing Sheets

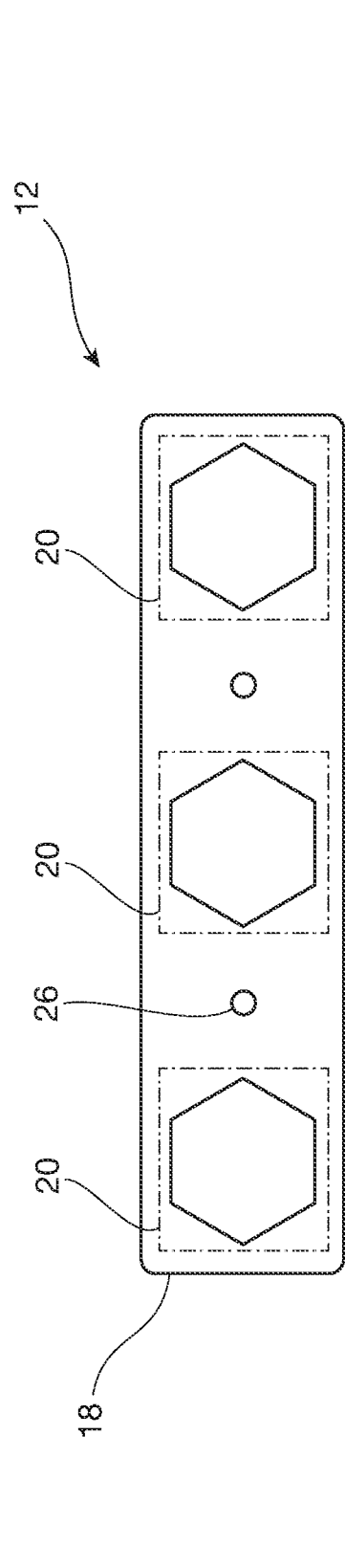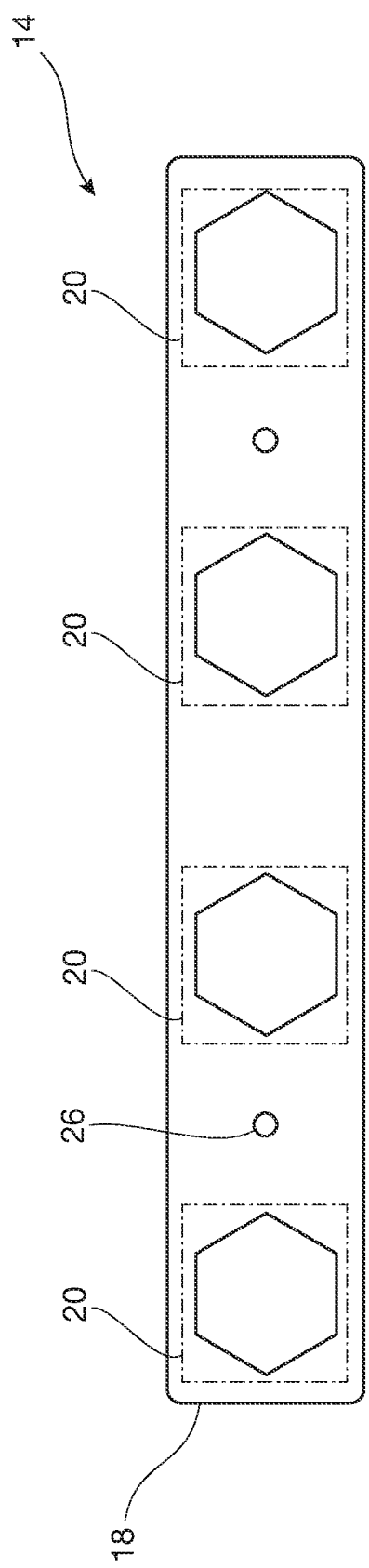

US 11,571,789 B2

SPANNER FOR SIMULTANEOUSLY GRIPPING A PLURALITY OF FASTENERS AND A METHOD FOR SIMULTANEOUSLY GRIPPING A PLURALITY OF FASTENERS

TECHNICAL FIELD

The disclosure herein generally relates to a spanner for simultaneously gripping a plurality of fasteners, a method for simultaneously gripping a plurality of fasteners, and a method for attaching a first part to a second part, and particularly but not exclusively to a spanner and its use for attachment of a suspension cylinder to the chassis of a truck.

BACKGROUND

Trucks and other mechanical objects may require that two parts be joined or separated. The parts may be attached with fasteners in the form of bolts and nuts, for example. Some trucks are very large—for example ultra-class trucks used in mining operations that can carry a payload of 300 tonnes or more—and it can be relatively time consuming, potentially dangerous, and difficult to join or separate some parts, for example suspension cylinders ("wheel struts") from the chassis of ultra-class trucks.

It may be desirable to reduce the amount of time, danger, or difficulty, for example, to join or separate parts on tucks or other mechanical objects.

SUMMARY

Disclosed herein is a spanner for simultaneously gripping a plurality of fasteners. The spanner comprises a body comprising a plurality of spaced apart fastener grips for simultaneously gripping the plurality of fasteners. The spanner comprises at least one attachment member for attaching the spanner to a structure the fasteners attach to.

In an embodiment, the body is elongated.

In an embodiment, the plurality of spaced apart fastener grips are longitudinally spaced apart with respect to the body. The plurality of spaced apart fastener grips may be arranged in a line.

In an embodiment, the body comprises a bar. The bar may comprise a flat bar.

In an embodiment, the center-to-center spacing of the plurality of spaced apart fastener grips is the same as the center-to-center spacing of a plurality of holes defined by the structure and for receiving the plurality of fasteners. The relative arrangement of the plurality of holes may be defined by a suspension cylinder attachment portion of a truck chassis.

In an embodiment, the at least one attachment member comprises at least one magnet. The at least one attachment member may be for removably attaching the spanner to the structure.

In an embodiment, the at least one magnet comprises a plurality of rare-earth magnets. The plurality of rare-earth magnets may be disposed on either side of a center of the body.

In an embodiment, the plurality of spaced apart fastener grips are configured for hexagonal bolt heads.

Disclosed herein is a method for simultaneously gripping a plurality of fasteners. The method comprises cooperatively arranging a plurality of fasteners and a spanner defined by any one of the preceding claims such that the plurality of fasteners are simultaneously gripped by the plurality of spaced apart fastener grips of the spanner.

An embodiment comprises the step of attaching the spanner to the structure. The spanner may be removably attached to the structure.

An embodiment comprises the step of magnetically attaching the spanner to the structure.

Disclosed herein is a method for attaching a first part to a second part. The method comprises the step of inserting a plurality of bolts through the first part and through the second part. The method comprises the step of simultaneously gripping the plurality of bolts with a spanner. The method comprises the step of threading and tightening a plurality of nuts onto the plurality of bolts inserted through the first part and through the second part.

In an embodiment, the first part is a truck chassis and the second part is a truck suspension cylinder.

In an embodiment, the plurality of bolts so inserted are laterally spaced apart.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which:

FIGS. 1-4 show plan views of various embodiments of a spanner for simultaneously gripping a plurality of fasteners.

DESCRIPTION OF EMBODIMENTS

FIGS. 1-4 show plan views of embodiments of a spanner, each embodiment being for simultaneously gripping a plurality of fasteners and each spanner being generally indicated by respective numerals 10, 12, 14 and 16. The different spanners 10-16 are for use on different trucks having different configurations, however they may be used for any suitable purpose. Each of the spanners 10-16 comprise a body 18 which is generally but not necessarily elongated and in these embodiments in the form of a flat metal bar. The metal is aluminium alloy. The body has a thickness of 3-15 mm, which is a generally an acceptable compromise between strength and mass, however thicknesses outside of this range may be acceptable for some application, for example thicknesses between 1 mm and 30 mm.

Each of the spanners 10-16 comprise a plurality of spaced apart fastener grips 20 for simultaneously gripping a plurality of fasteners, the fastener grips being indicated by dashed boxes 20. The plurality of fastener grips 20 are integral with the body 18 and define a plurality of fastener-head shaped holes in the form of hexagonal through holes in which the plurality of fasteners can be operationally received. The fastener grips comprise a rigid material, in this embodiment aluminium alloy. Generally, but not necessarily, the fastener grips 20 are configured to close-fittingly receive the faster heads, that is so that the fastener heads cannot spin around the axis of the fasteners when received by the fastener grips 20. The illustrated but not necessarily all embodiments have a looser than interference fit between the fastener heads and the fastener grips to facilitate easy insertion and removal of the fasteners. In the present embodiment, the hexagonal fastener grips are for hexagonal head bolts, or nuts.

Figure 1:
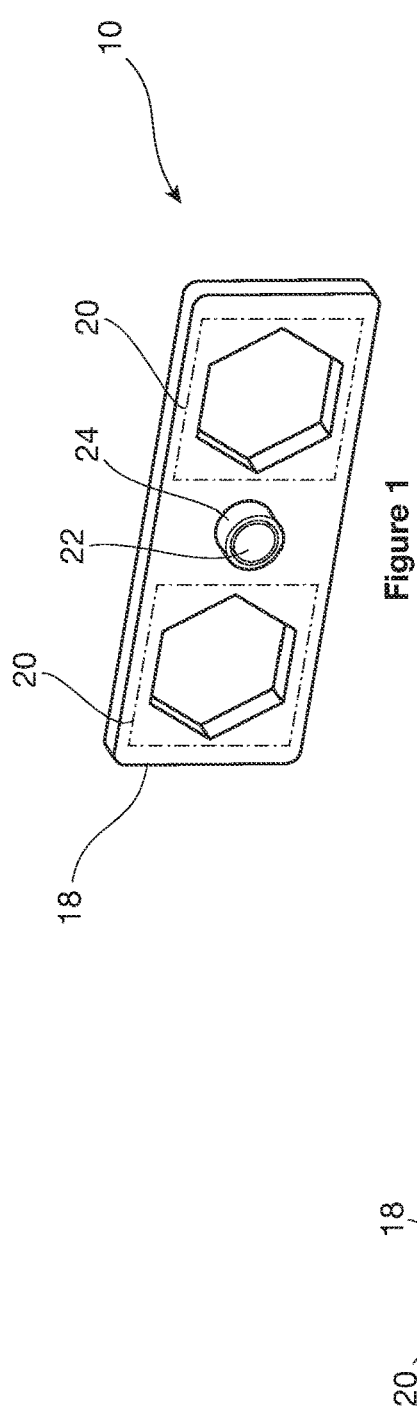
Figure 2:
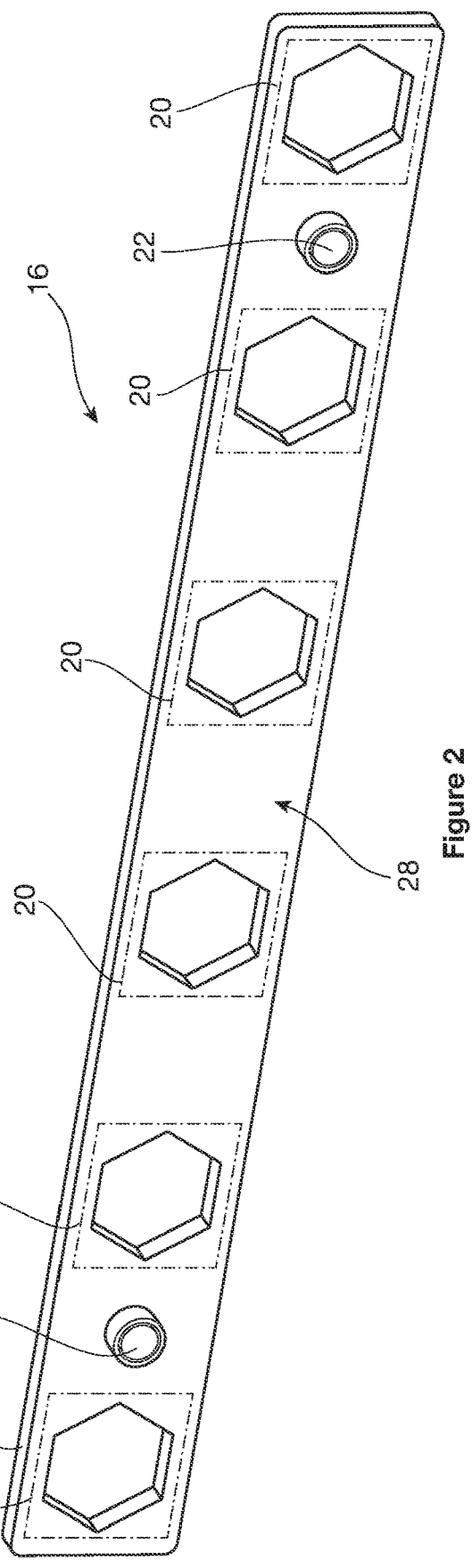
Figure 5:
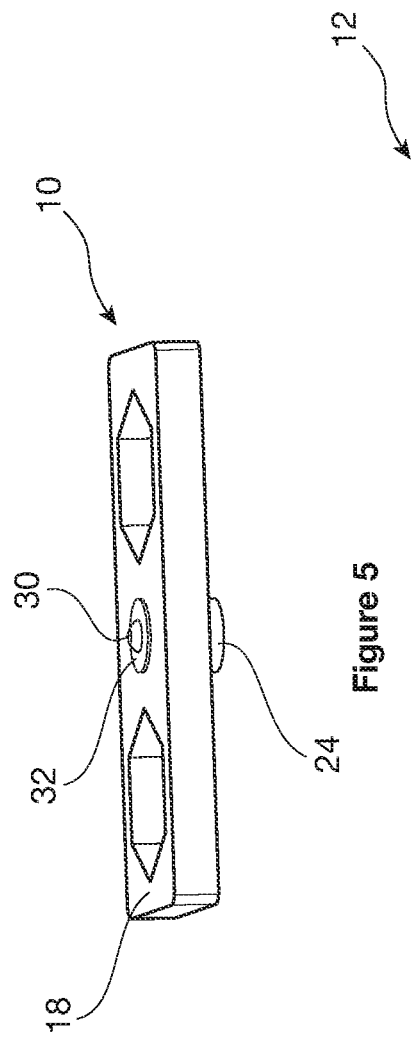
FIG. 5 shows a side isometric view of one of the embodiments of a spanner.
Figure 6:
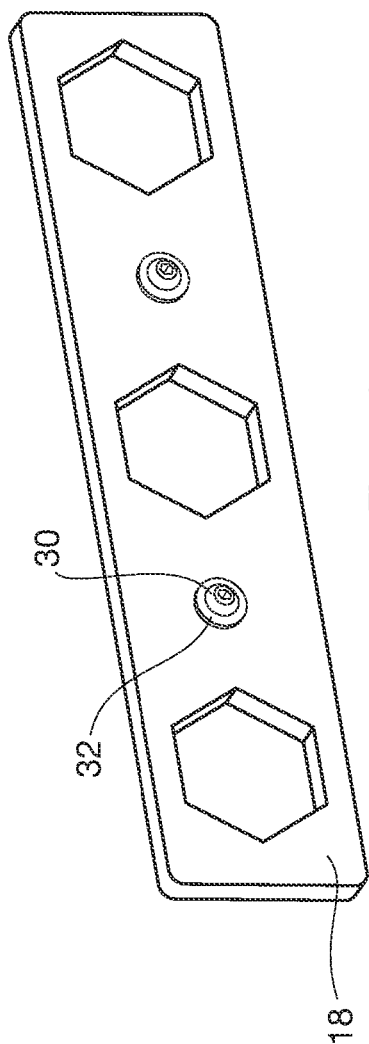
FIG. 6 shows an isometric rear view of one of the embodiments of a spanner.
Figure 7:
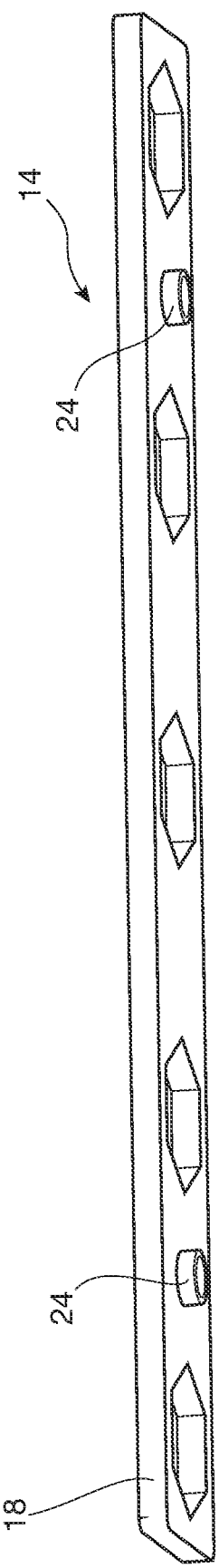
FIG. 7 shows a side isometric view of one of the embodiments of a spanner.

Each of the spanners 10-16 comprise at least one attachment member 22 for removable attachment of the spanners 10-16 to a structure that the fasteners can be attached to, with the attachment members 22 shown on spanners 10 and 16 and hidden for illustrative purposes on spanners 12 and 14. The at least one attachment member 22 comprises at least one magnet in the form of one (in the case of spanner 10) or a plurality (in the cases of spanners 12-16) of rare-earth (neodymium) magnets capable of holding the weight of the associated spanner when magnetically attached to a structure. Each of the magnets exert a magnetic attraction force in the range of 2-20 kg, however some embodiments may have magnets that exert an attractive force below or above this range as desired and suitable. FIGS. 5-7 show side and bottom views of spanners 10-14 and the attached members 22. Each of the magnets is integrated with a holding pot 24, which optionally encircles the perimeter of the magnets. The holding pots 24 each comprise a boss having a female thread. The boss is inserted in a hole (for example hole 26) defined by the body 18. As shown in FIG. 5, a screw 30 is inserted through an optional washer 32 from the opposite side of the body 18 and engaged with the female thread to attach the holding pot 24 and the magnet to the body 18. When there are a plurality of rare-earth magnets 22, they are generally disposed on either side of a centre 28 (indicated on FIG. 2, for example) of the body.

Figure 8:
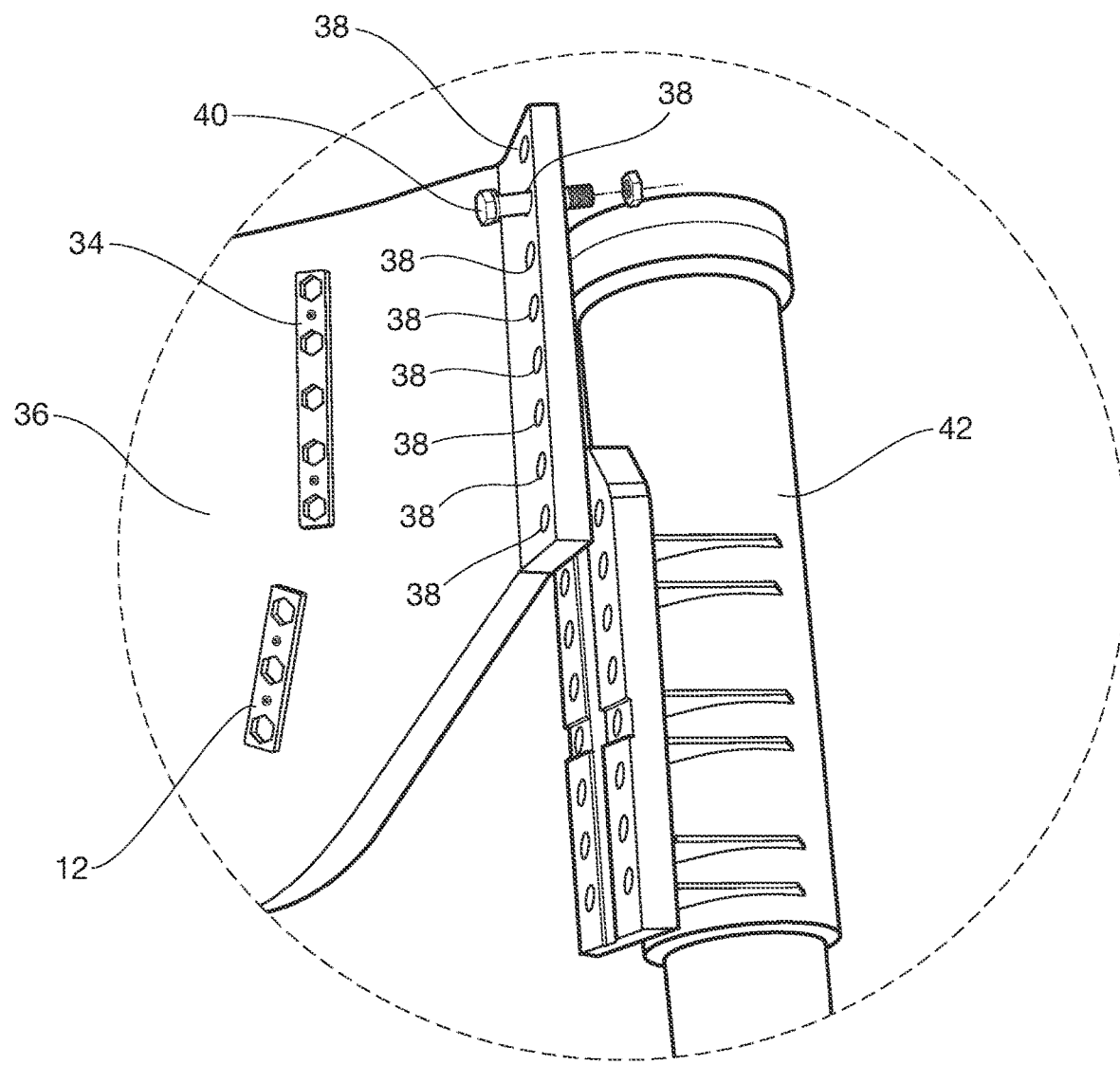
FIG. 8 shows an elevational view of a portion of a truck chassis, a suspension cylinder for attachment thereto, and embodiments of the spanner removably attached to the chassis.

FIG. 8 shows embodiments of spanners 12 and 34 attached by magnets to a structure 36 in the form of a chassis of a truck. The magnets enable the spanners to be easily removed from the structure 36. The truck can be any of, for example, a mining, off highway or ultra-class truck. Examples includes CATAPILLER truck models 773 to 797. In FIG. 8, the spanners 12 and 34 are not yet in use but conveniently disposed adjacent a plurality of holes 38 defined by the structure 36 in which the fasteners 40 in the form of a bolt-nut combination are to be disposed. The fasteners 40 are for attaching a wheel strut 42 and the chassis 36, and the spanners 12 and 34 may benefit the process of attaching or detaching the suspension cylinder 42 and the chassis. The magnets securely hold the spanners 12,34 in a desired position, however the spanners 12,34 can also be relatively easily repositioned on the chassis as needed or desired by way of the removable magnetic attachment.

The plurality of spaced apart fastener grips 20 are longitudinally spaced apart with respect to the body 18 and are correspondingly arranged with the plurality of holes 38 such that each of the plurality of grips 20 can be simultaneously disposed at a different one of the plurality the holes 38. In the illustrated embodiments, the plurality of spaced apart fastener grips 20 are arranged in a line. The center-to-center spacing the plurality of spaced apart fastener grips 20 is the same as the center-to-center spacing of the plurality of holes 38 defined by the structure 36.

Figure 9:
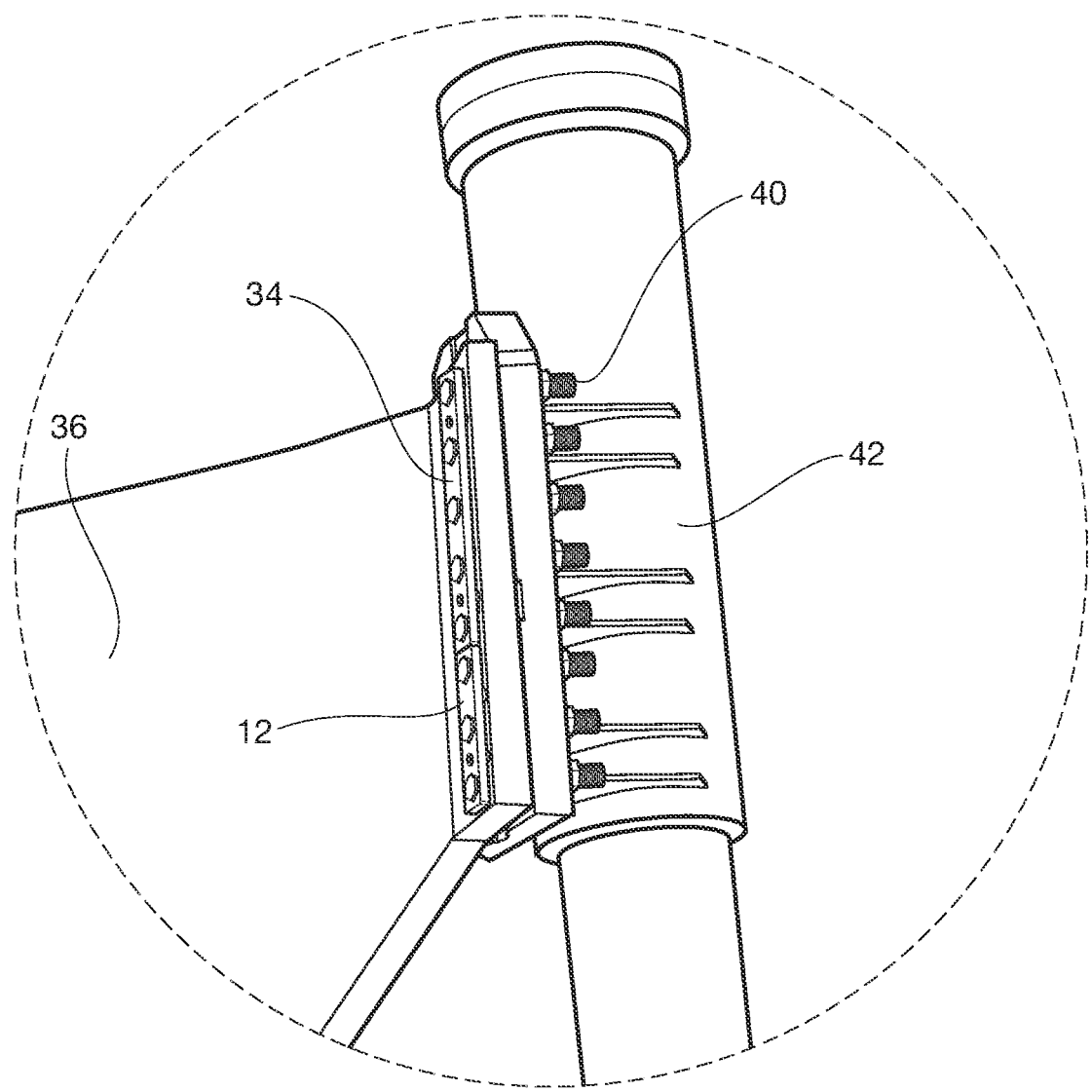
FIG. 9 shows the embodiments of the spanner removably attached to the chassis and gripping a plurality of bolt heads.

As shown in FIG. 9, in use the heads of the plurality of bolts are simultaneously gripped by spanners 12 and 34, which prevents rotation of the spanner and any of the bolts when a nut is tightened on any of the plurality of bolts.

The body of the spanners 12-16 can be fabricated by machining bar aluminium alloy or casting aluminium alloy or another suitable material. The body of the spanners can generally be fabricated using any suitable fabrication technique.

Embodiment of a method for simultaneously gripping a plurality of fasteners will now be described with reference to the above described spanner embodiments. Embodiments comprise cooperatively arranging a plurality of fasteners and a spanner 12-16 such that the plurality of fasteners 40 are simultaneously gripped by the plurality of spaced apart fastener grips of the spanner 12-16, as shown in FIG. 9. An optional step includes removably attaching the spanner to the structure and adjacent the plurality of holes defined thereby, which can comprise magnetically attaching the spanner to the structure.

The suspension cylinder can be installed into position on the truck as per the manufacturer's instructions. Once the bolts and nuts are in place and hand tightened, the nuts can be simultaneously engaged with an outer edge of the spanner 12-16 to identically rotationally orientate the nuts. Note the rotational orientation of the grips 20 are optionally identical. An internal edge of the fastener grips is parallel to an outer edge so the nuts after rotational orientation can be simultaneously received by the plurality of fastener grips without further rotational reorientation. The spanner 12-16 is moved such that the bolt heads are received by the plurality of fastener grips and the at least one magnet 22 contacts the structure 36 and into magnetic attachment. The nuts 44 can then be individually tightened. The spanner 12-16 can remain in position until the suspension cylinder is removed at the end of its life, for example, facilitating removal of the suspension cylinder.

Now that embodiments have been described, it will be appreciated that embodiments may have the following advantages:

- Less people and less person hours may be needed to replace a suspension cylinder, for example. A single person can tighten the fasteners by themselves.
- It may be easier to fasten or unfasten the bolts, which additionally reduces worker stress.
- Safety may be improved by eliminating the need to hold a bolt head in awkward positions, which may eliminate slip and other workplace hazards.
- Safety may be improved by reducing the chance of hands being pinched at truck pinch points.
- Safety may be improved by reducing the exposure to the detached wheel strut, which has a mass of greater than one tonne and may crush a person if it falls on them.
- Breaker bars and extension bars may not be required.
- More accurate and secure tightening of bolts as bolt heads are retained in position and cannot turn while the nuts are tightened.

Variations and/or modifications may be made to the embodiments described without departing from the spirit or ambit of the invention. For example:

- The body may not be elongated, but rather have a square, round, or generally any suitable or appropriate shape.
- Generally, any suitable material may be used, not just aluminium alloy, examples of which include but are not limited to mild steel, a polymer and composites including but not limited to fibre reinforced polymer.
- The bar may not be flat, but may have ribbing, latticing or other feature, for example which may improve strength and may enable a reduction in material.
- One or more of the plurality of fastener grips may comprise a socket.
- The fastener grips may be configured for fastener heads (or other parts of a fastener) that do not have a hexagonal shape. For example, the fastener grips may have an insert in the form of a blade receivable within a slotted head. The fastener grip may have a square or TORX™ shape for corresponding fastener heads.

The at least one attachment member may alternatively comprise a suction cup, an electromagnet, adhesive tape, or generally any suitable fastening system.

The magnetic holding pots may be attached in generally any suitable way, for example with an externally threaded boss screwed into the body or fastened with a nut, riveted through a countersunk hole, fastened with adhesive, adhesive tape or a friction fit. Alternatively, the magnet may be without a holding pot and fastened using, for example, an adhesive. Alternatively, the body may be magnetised, for example manufactured from a magnetic material in the form or magnetised steel, ferrite or rare earth magnetic material, for example.

The bolt hole pattern may not be an array in some examples, and consequently the plurality of fastener grips may not form an array—they may form a zig zag, curve or generally any appropriate pattern.

While the engagement of the spanners with the heads of the bolts has been disclosed above, the spanners may alternatively be used to engage the nuts or other fastener components.

Different trucks may use different sized bolts that may have different spacings. Various embodiments may be provided to accommodate the different sized bolts and their different spacings.

Embodiments may be used on mechanical devices other than trucks, examples of which include but are not limited to excavators, and production line machinery.

The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A spanner for simultaneously gripping a plurality of fasteners, the spanner comprising:
   a body comprising a plurality of spaced apart fastener grips for simultaneously gripping the plurality of fasteners; and
   at least one attachment member for attaching the spanner to a structure the fasteners attach to.

2. A method for simultaneously gripping a plurality of fasteners, the method comprising:
   cooperatively arranging a plurality of fasteners and the spanner of claim 1, such that the plurality of fasteners are simultaneously gripped by the plurality of spaced apart fastener grips of the spanner.

3. The method for simultaneously gripping a plurality of fasteners as claimed in claim 2, further comprising the step of removably attaching the spanner to the structure.

4. The method for simultaneously gripping a plurality of fasteners as claimed in claim 3, further comprising the step of magnetically attaching the spanner to the structure.

5. The spanner as claimed in claim 1, wherein the plurality of spaced apart fastener grips are longitudinally spaced apart with respect to the body.

6. The spanner as claimed in claim 5, wherein the plurality of spaced apart fastener grips are arranged in a line.

7. The spanner as claimed in claim 1, wherein the body comprises a bar.

8. The spanner as claimed in claim 7, wherein the bar comprises a flat bar.

9. The spanner as claimed in claim 1, wherein the center-to-center spacing of the plurality of spaced apart fastener grips is the same as the center-to-center spacing of a plurality of holes defined by the structure and for receiving the plurality of fasteners.

10. The spanner as claimed in claim 9, wherein the relative arrangement of the plurality of holes are defined by a suspension cylinder attachment portion of a truck chassis.

11. The spanner as claimed in claim 1, wherein the at least one attachment member comprises at least one magnet.

12. The spanner as claimed in claim 11, wherein the at least one magnet comprises a plurality of rare-earth magnets disposed on either side of a center of the body.

13. The spanner as claimed in claim 1, wherein the at least one attachment member is for removably attaching the spanner to the structure the fasteners attach to.

14. The spanner as claimed in claim 1, wherein the body is elongated.

15. The spanner as claimed in claim 1, wherein the plurality of spaced apart fastener grips are configured for hexagonal bolt heads.

16. A method for attaching a first part to a second part, the method comprising the steps of:
   inserting a plurality of bolts through the first part and through the second part;
   simultaneously gripping the plurality of bolts with a spanner;
   threading and tightening a plurality of nuts onto the plurality of bolts inserted through the first part and through the second part.

17. The method for attaching a first part to a second part as claimed in claim 16, wherein the first part is a truck chassis and the second part is a truck suspension cylinder.

18. The method for attaching a first part to a second part as claimed in claim 16, wherein the plurality of bolts so inserted are laterally spaced apart.

* * * * *